United States Patent
Pugh et al.

(10) Patent No.: US 6,669,266 B1
(45) Date of Patent: Dec. 30, 2003

(54) DOOR ASSEMBLY FOR IMPROVED VEHICLE ACCESS

(75) Inventors: Michael R. Pugh, Winamac, IN (US); Ned McCormick, Wimamac, IN (US); Christopher Lease, Royal Center, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 10/342,928

(22) Filed: Jan. 15, 2003

(51) Int. Cl.[7] ............................................. B60J 5/00
(52) U.S. Cl. ................... 296/146.11; 296/178; 414/921
(58) Field of Search .................. 296/146.11, 146.5, 296/146.9, 155, 178; 29/401.1; 414/921, 539, 540, 537, 545, 546, 462; 182/91; 280/166, 163

(56) References Cited

U.S. PATENT DOCUMENTS

| | | | |
|---|---|---|---|
| 1,241,795 A | * 10/1917 | Weaver | 296/178 |
| 1,514,124 A | * 11/1924 | Bauer | 296/146.11 |
| 2,608,434 A | * 8/1952 | Brockway | 296/178 |
| 3,905,638 A | * 9/1975 | Persico | 296/178 |
| 3,907,357 A | * 9/1975 | Davis, Jr. | 296/178 |
| 4,131,209 A | * 12/1978 | Manning | 296/178 |
| 4,231,144 A | * 11/1980 | Bernacchia, Jr. | 296/178 |
| 4,251,179 A | * 2/1981 | Thorley | 414/921 |
| 4,278,389 A | 7/1981 | Konkle | 414/540 |
| 4,339,147 A | * 7/1982 | Kimzey | 296/146.11 |
| 4,346,931 A | * 8/1982 | Merkle | 296/148 |
| 4,474,527 A | 10/1984 | Risner et al. | 414/540 |
| 4,551,056 A | 11/1985 | Risner | 414/539 |
| 4,666,204 A | * 5/1987 | Reinholtz | 296/178 |
| 4,847,972 A | 7/1989 | Anderson et al. | 29/401.1 |
| 5,259,081 A | * 11/1993 | Henderson | 414/921 |
| 5,380,144 A | * 1/1995 | Smith et al. | 414/921 |
| 5,577,793 A | * 11/1996 | Kobasic | 296/178 |
| 5,624,127 A | * 4/1997 | Arreola et al. | 280/163 |

(List continued on next page.)

FOREIGN PATENT DOCUMENTS

| | | | |
|---|---|---|---|
| JP | 59 11932 | * | 1/1984 |
| JP | 2 262422 | * | 10/1990 |

OTHER PUBLICATIONS

The best Sprinter ever. (webpage accessible from http://www.mercedes–benz.com/e/ecars/transporter/sprinter/default.htm), downloaded Nov. 11, 2002.

Braun Corporation: leader in handicapped accessible vehicles, wheelchair lifts (webpage at http://www.braunlift.com/pages/consumer/vangater.html), downloaded Nov. 12, 2002.

Sprinter van (webpage at http://www.mercedes–benz.co.nz/mercedes–benz/vans–sprinter.html), Nov. 12, 2002.

Mercedes Sprinter Van (webpage at http://www.4wdonline.con/Mercedes/Vans/Sprinter.html), Nov. 12, 2002.

*Primary Examiner*—Kiran Patel
(74) *Attorney, Agent, or Firm*—Michael, Best & Friedrich LLC

(57) ABSTRACT

The invention provides a vehicle door assembly including two entrances. Both entrances are surrounded by a frame assembly for mounting on the vehicle. One of the entrances is at about the height of the vehicle floor, while the other is lower than the vehicle floor and opens into a stairwell that leads up and into the vehicle. The floor-level door may be suitable for use with an appliance for assisting passengers to enter the vehicle, such as a lift or a ramp. The door assembly includes doors for closing the entrances. The door assembly may be mass-produced as a modular component and mounted on a conventional vehicle that has been specially modified to accept the door assembly.

11 Claims, 9 Drawing Sheets

U.S. PATENT DOCUMENTS

| | | | | |
|---|---|---|---|---|
| 5,678,883 A | * | 10/1997 | Bittner et al. | 296/178 |
| 5,797,646 A | * | 8/1998 | Jeunehomme et al. | 296/178 |
| 6,022,066 A | * | 2/2000 | Tremblay et al. | 296/146.5 |
| 6,071,064 A | | 6/2000 | Hackett | 414/545 |
| 6,238,169 B1 | | 5/2001 | Dupuy et al. | 414/546 |
| 6,263,804 B1 | * | 7/2001 | Rizk | 280/166 |
| 6,328,374 B1 | * | 12/2001 | Patel | 296/155 |
| 6,352,396 B1 | | 3/2002 | Budd et al. | 410/8 |
| 6,554,348 B1 | * | 4/2003 | Gernstein | 296/178 |

* cited by examiner

DOOR ASSEMBLY FOR IMPROVED VEHICLE ACCESS

FIELD OF THE INVENTION

The present invention relates to products for facilitating access to automobiles and, more specifically, to a door assembly for a vehicle.

BACKGROUND OF THE INVENTION

Major automobile manufacturers do not presently mass-produce any highway vehicle that specifically accommodates the requirements of physically challenged passengers. Consequently, products for assisting people traveling in wheel chairs or gurneys, for example, while entering and exiting automotive vehicles are necessarily installed as after-market accessory products.

Previously known accessory products include wheel chair lifts, lift platforms, ramps and lowered floor surfaces. Typically, a door of a mass-produced van is enlarged or otherwise modified to accept the product. Even so, the product usually occupies the entire width of the accessorized entrance. While these previously known products are helpful, none is entirely satisfactory. Among other problems, the previously known products tend to discourage people who are not physically challenged from using the assisted entrance.

Seating locations for passengers who use the assisted entrance are typically provided in a rear passenger compartment of the van, near the assisted entrance. Although there may be additional doors in the rear compartment, they usually open at van floor level, a height which makes them difficult for all passengers to use. Accordingly, unassisted passengers who desire to ride in the rear compartment must first pass through the front compartment or, alternatively, negotiate the accessorized door. Those who pass through the front door, then move rearwardly past the assisted seating locations to reach their seats. This circuitous route is undesirable.

In the alternative, one may enter by the assisted door. For example, a caregiver who assists his or her wheelchair patient into an accessorized van usually squeezes past the wheelchair to ride with the patient. Passengers should not have to squeeze through to enter.

A need exists for a new product that facilitates van access for all passengers, regardless of handicaps or disabilities. An accessory that permits a friend or caregiver to enter a vehicle at the same time as a physically challenged person would be welcomed. Ideally, the new product can be used in conjunction with conventional wheel chair lifts or lift platforms.

SUMMARY OF THE INVENTION

The invention provides a vehicle door assembly. The door assembly includes two entrances immediately adjacent to each other. One of the entrances is at about the height of the vehicle floor, while the other is lower than the vehicle floor and opens into a stairwell that leads up and into the vehicle. The door assembly includes doors for closing the entrances. The door assembly may be mass-produced as a modular component and mounted on a conventional vehicle that has been specially modified to accept the door assembly.

In some models, the frame assembly includes a post that divides the floor-level entrance from the lower entrance. The stairwell is positioned inside the lower entrance and includes a stair tread positioned below the elevation of the floor. Preferably, the lower entrance is positioned rearwardly of the floor-level entrance, as determined when the door assembly is mounted on the vehicle.

In other models, the door assembly is suitable for a vehicle equipped with an appliance for assisting passengers to enter the vehicle, such as a lift or a ramp. The door assembly includes an assisted entrance appropriate for use by a passenger being assisted by the appliance. An unassisted entrance for unassisted passengers is located immediately adjacent to the assisted entrance. Both entrances are surrounded by a frame assembly for mounting on the vehicle. A stairwell attached to the frame assembly is positioned to serve the unassisted entrance.

A conventional van can be modified to utilize the invention. A portion of the van wall is removed. A portion of the van floor near the wall cut-out is also removed. The door assembly is inserted into the wall cut-out so that the stairwell fits into the floor cut-out. Permanently mounting the frame assembly to the vehicle produces a van that is suitable for carrying assisted and unassisted passengers together in ease and comfort.

DETAILED DESCRIPTION

Figure 1:
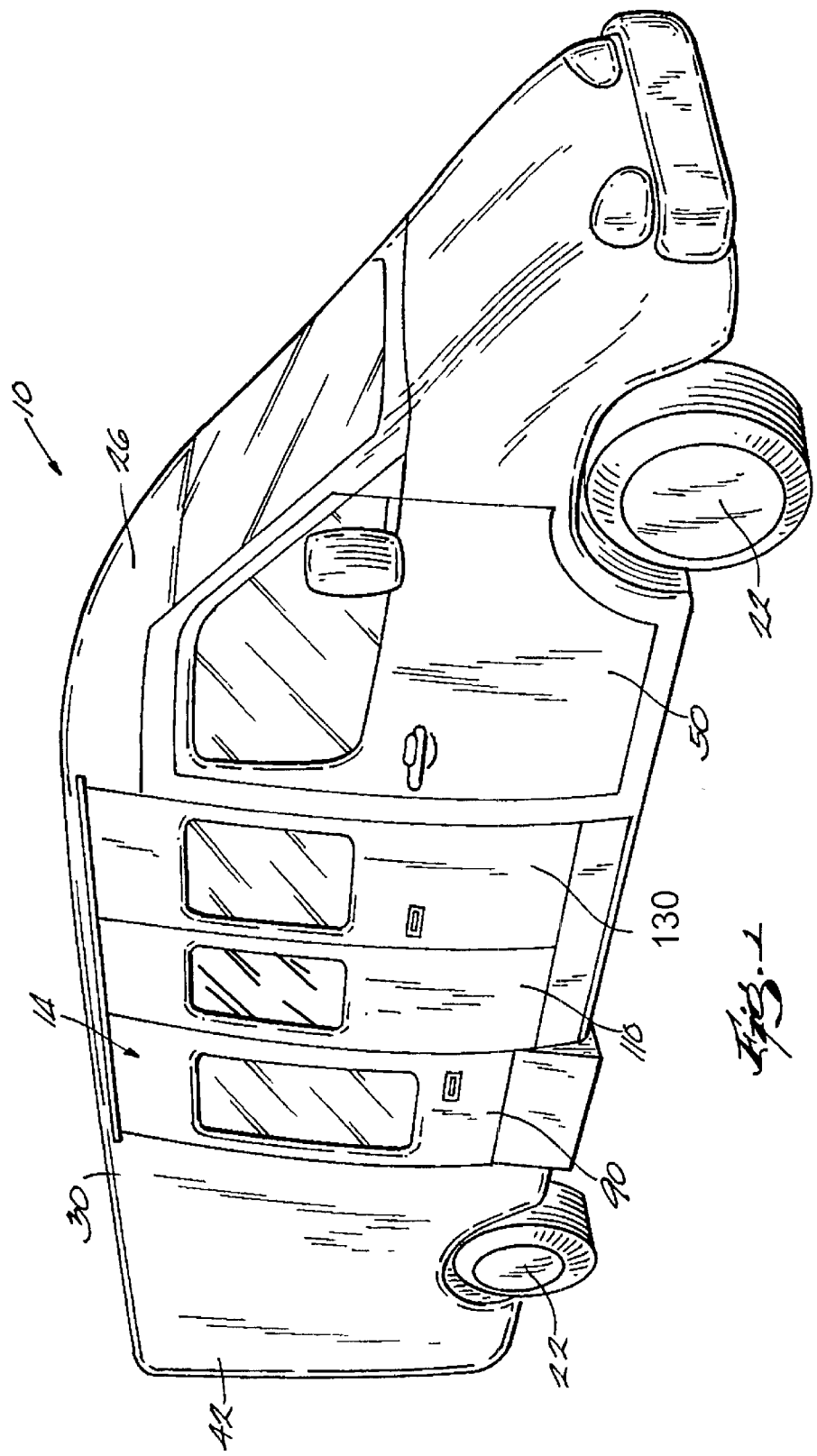
FIG. 1 is a perspective view of a vehicle equipped with a door assembly of the present invention, which includes three access doors to a rear passenger compartment.

In a preferred embodiment, the invention is a vehicle such as vehicle 10 including modular door assembly 14, depicted in FIG. 1. Generally, vehicle 10 is a passenger vehicle for carrying one or more passengers in addition to a driver. For example, vehicle 10 may be a Mercedes-Benz™ van of the type known as Sprinter™, which is subsequently modified to include door assembly 14. As another example, vehicle 10 may be a Dodge™ van known as Freightliner™, modified to include door assembly 14.

Turning now to FIG. 1, vehicle 10 includes front doors 50, and wheels 22. Passenger compartment 46 (best seen in FIG. 2) is enclosed by vehicle walls 42 and divided by front seats (not shown) into front and rear compartments (26 and 30, respectively). Door assembly 14 provides direct access to rear compartment 30 (best seen in FIG. 2) and includes assisted access doors 110, 130 and unassisted access door 90, which are located on the right side of vehicle 10. Doors 90, 110, 130 close entrances 76, 78 (best seen in FIG. 5).

Entrances 76, 78 are surrounded by frame assembly 60 for mounting on vehicle 10. One of the entrances 78 is at about the height of vehicle floor 54 (shown in FIG. 2), while the other 76 is lower than vehicle floor 54 and opens into a stairwell 80 (shown in FIG. 2) that leads up and into vehicle 10. The floor-level doors 110, 130 may be suitable for use with an appliance for assisting passengers to enter the vehicle, such as a lift or a ramp. Door assembly 14 may be mass-produced as a modular component and mounted on a conventional vehicle that has been specially modified to accept the door assembly.

Figure 2:
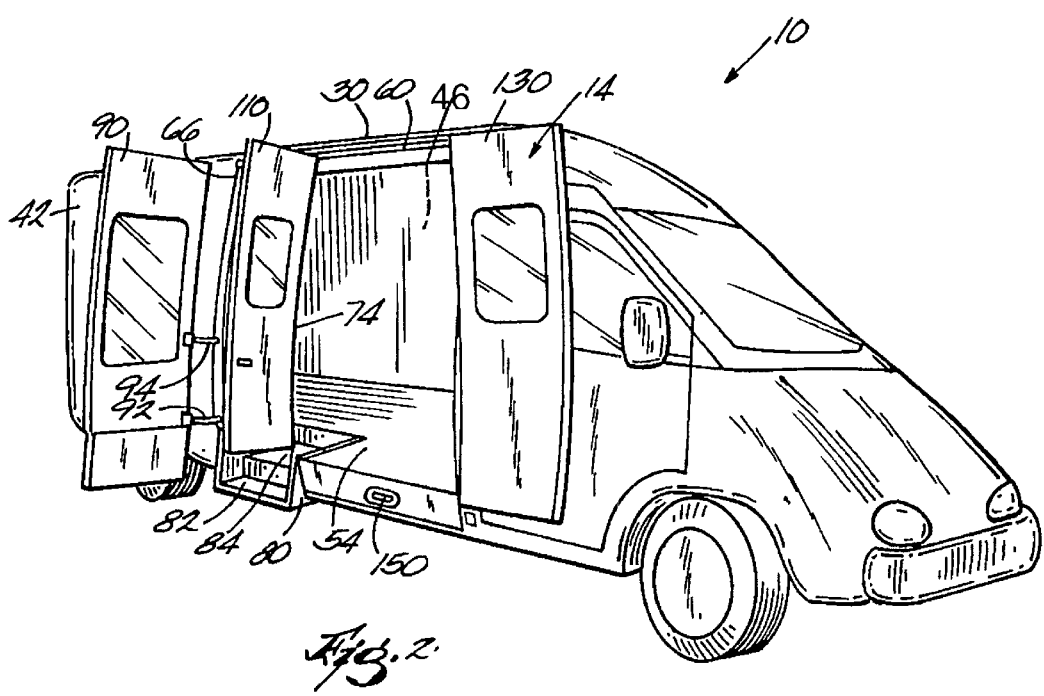
FIG. 2 is a perspective view of the vehicle of FIG. 1 with the three access doors in open position.

FIG. 2 depicts vehicle 10 with the three access doors 90, 110, 130 in open position. Conventional seats may be installed in rear compartment 30, as well as lift equipment. Also, some of the floor area in rear compartment 30 is preferably left open for wheelchairs or other specialized apparatus. In the interest of clarity, the contents of compartment 30 are not shown in FIG. 2.

It can be seen in FIG. 2 that stairwell 80 includes two steps 82, 88 leading from about ten inches above ground level up to the level of van floor 54. Frame assembly 60 is depicted as permanently attached to vehicle 10, and convenience lamp 150 can be seen beneath assisted doors 110, 130.

Figure 4:
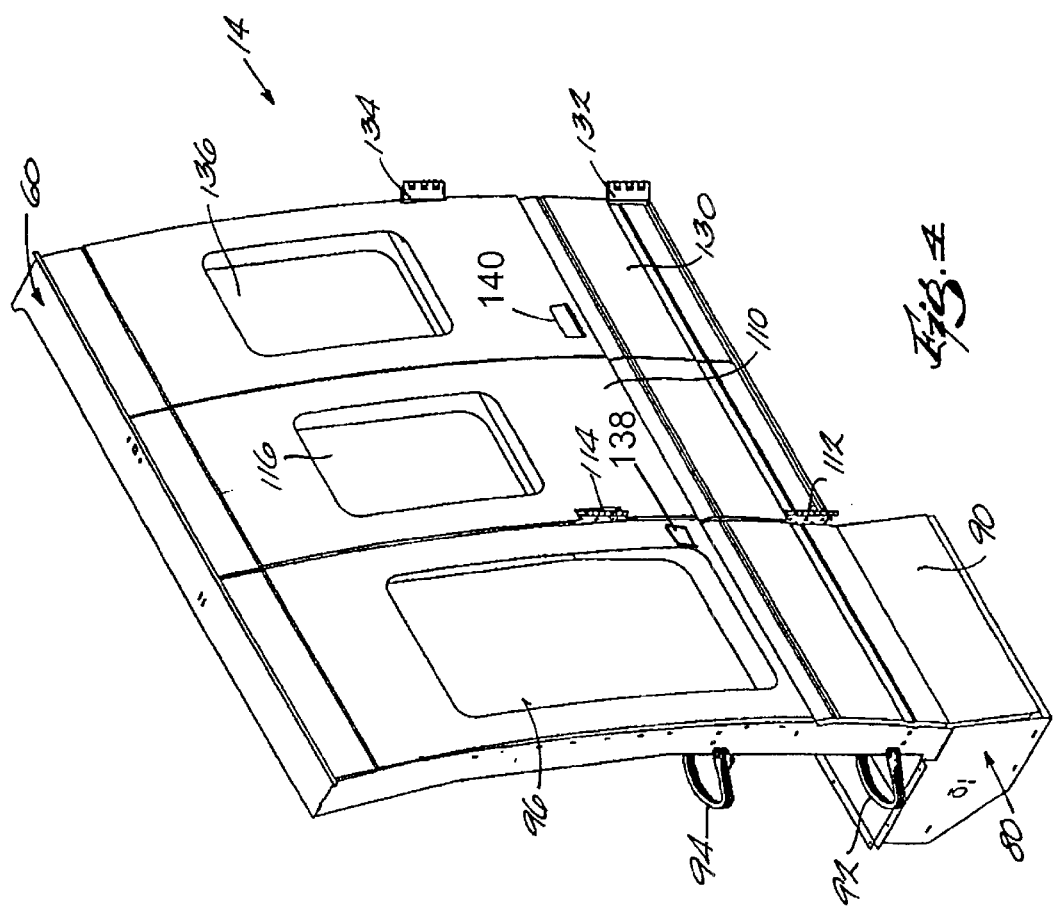
FIG. 4 is a perspective view of the door assembly of FIG. 1.

Also visible in FIG. 2 are hinges 92 and 94 for suspending unassisted door 90 from jamb 66 of frame assembly 60. Post 74 of frame assembly 60 supports assisted door 110 by means of hinges 112, 114, which are best seen in FIG. 4. Door 90 is locked and unlocked, open and closed by a power door operator (not shown), which is activated by controls located in front compartment 26.

Figure 3:
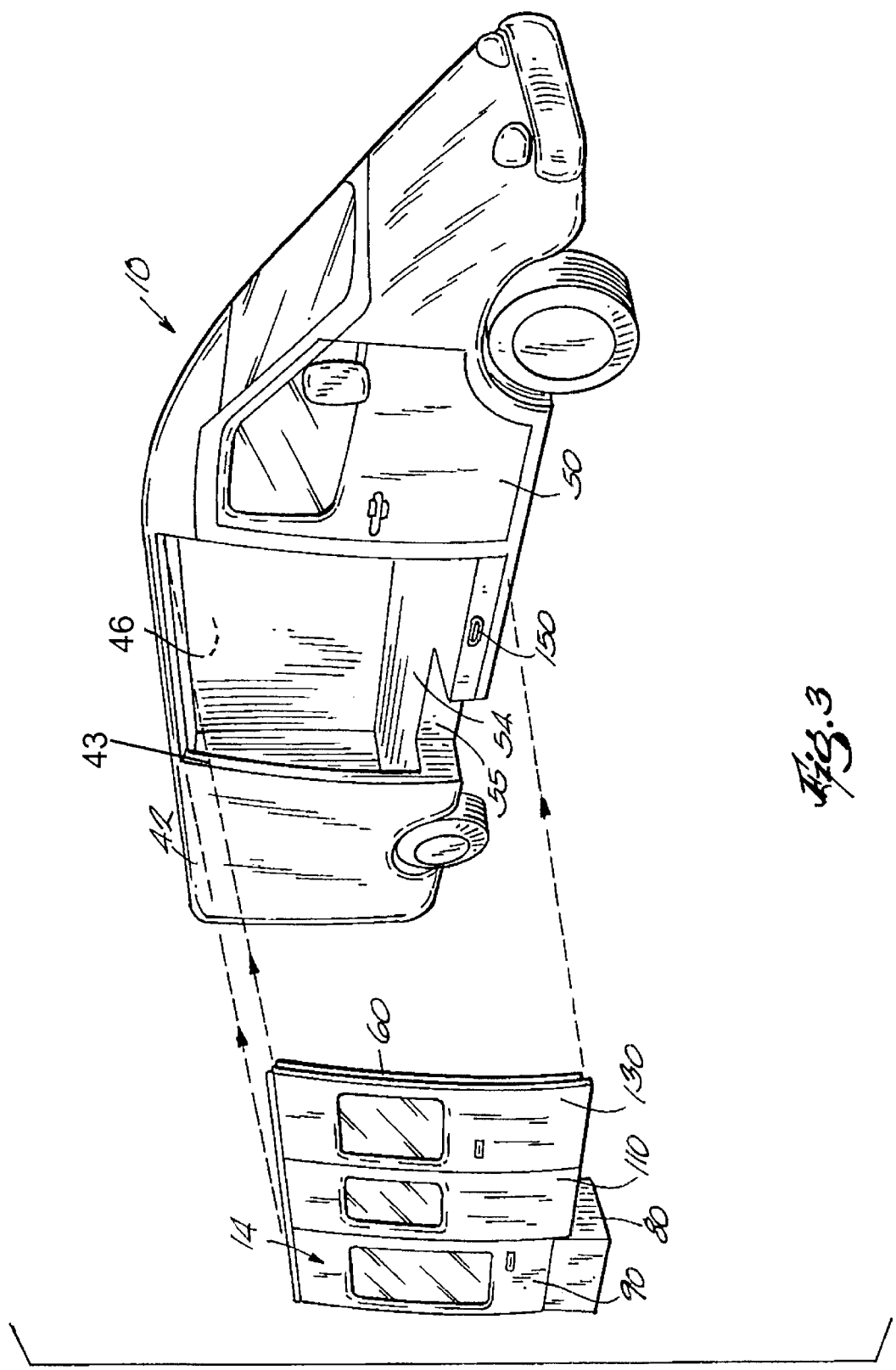
FIG. 3 is an exploded view of the vehicle of FIG. 1.

FIG. 3 illustrates, among other things, how a prior art van can be modified to accept the present invention. As seen in FIG. 3, a portion of sidewall 42 is cut away and removed to provide opening 43. Additionally, a portion of van floor 54 and underlying support members (not shown) is cut away to provide opening 55. Door assembly 14 is subsequently mounted so that opening 43 receives frame assembly 60 and opening 55 receives stairwell 80.

FIG. 4 shows the manner in which frame assembly 60, in cooperation with stairwell 80, supports and substantially surrounds the three access doors 90, 110, 130. Unassisted door 90 is rotatably mounted on bracket assembly 60 by a pair of hinges 92, 94. Preferably, one of the hinges 92, 94 is a spring-mounted, gas hinge. Door 90 includes a door handle 138. Assisted door 110 is located immediately forward of unassisted door 90 and is rotatably mounted on frame assembly 60 by hinges 112, 114. Assisted door 130 is suspended forward of assisted door 110 by hinges 132, 134. At least one of the doors 90, 110, 130 includes a door handle 140. Each of the three doors 90, 110, 130 includes a window (96, 116, 136, respectively).

Figure 5:
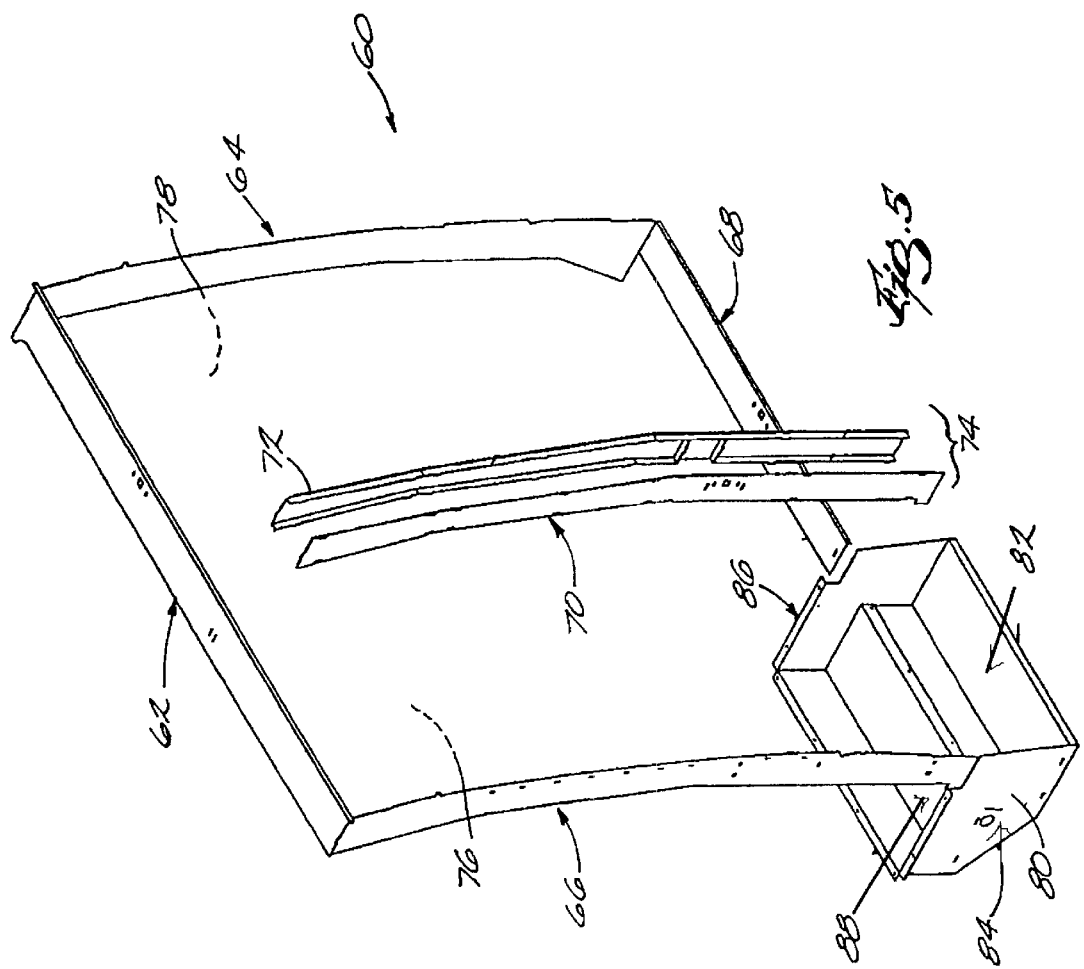
FIG. 5 is a perspective view of frame assembly components and stairwell components.

Components of frame assembly 60 are illustrated in FIG. 5. Each of the components is a light-weight and relatively strong article of sheet metal. Header 62 is a horizontally-oriented, overhead member that extends over all three of the access doors 90. 110, 130. Jambs 64, 66 are joined to opposite ends of header 62 and extend vertically downward. Sill 68 fastens to the lower end of jamb 64 and extends rearward. Stairwell 80 is fastened to the rear end of sill 68 and the lower end of jamb 66 to complete a generally rectangular outer frame. Interior jambs 70, 72 are joined to each other to form an interior post 74, that is fastened to header 62, and the rear end of sill 68. As best seen in FIG. 3 and FIG. 4, post 74 supports hinges 112, 114; jamb 66 supports hinges 92, 94; and jamb 64 supports hinges 132, 134.

Continuing with FIG. 5, frame assembly 60 defines an unassisted entrance 76 and a separate, assisted entrance 78. Intermediate frame portion or post 72 separates the two entrances, 76, 78. Preferably, unassisted entrance 76 is located rearward of assisted entrance 78 so that seating for the unassisted passengers may be placed adjacent to unassisted door 90 in a forward-facing position. This arrangement maximizes the open space available to assisted passengers and permits the unassisted passengers to attend to the assisted passengers.

The unassisted entrance 76 is served by stairwell 80, which includes lower step 82 and upper step 88 leading from approximately ten inches above ground level to about the level of van floor 54. Sidewalls 86, 84 enclose the sides of stairwell 80. When unassisted door 90 is in the closed position, it effectively covers the lower end of stairwell 80.

Figure 6:
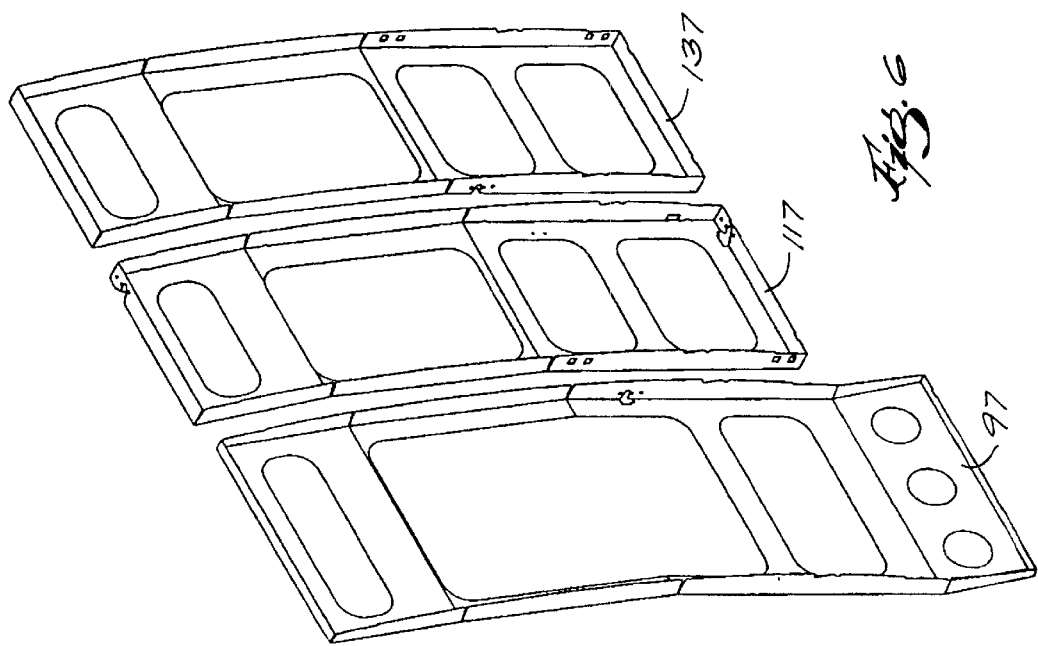
FIG. 6 is a perspective view of interior door frames for the door assembly.
Figure 7:
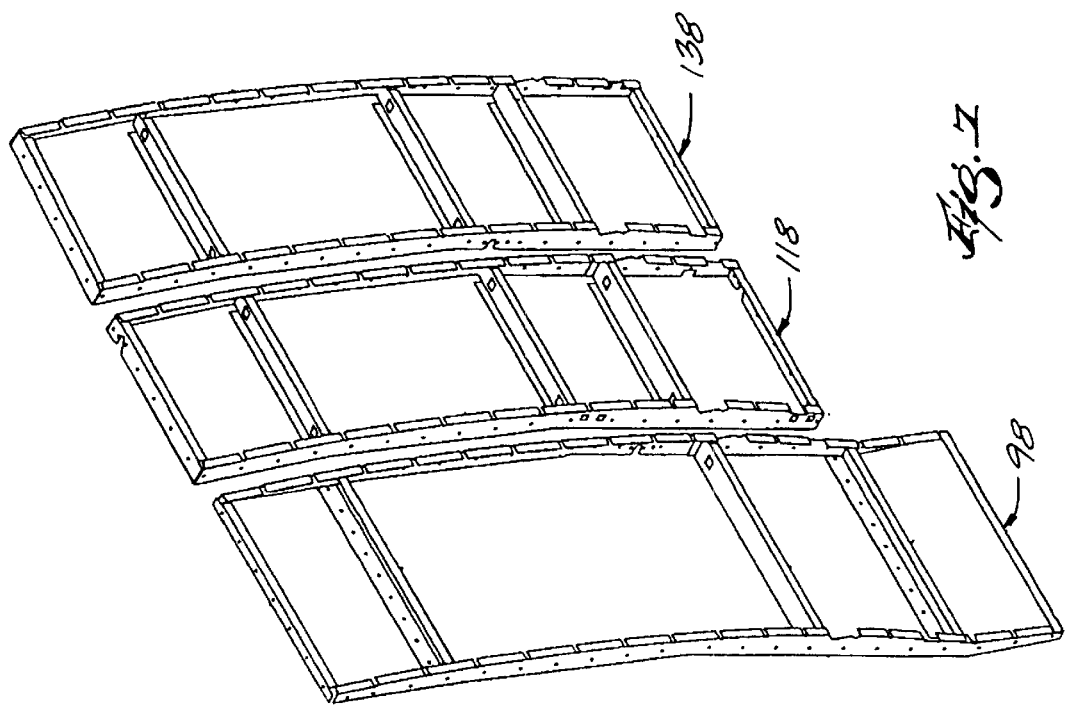
FIG. 7 is a perspective view of internal support structures for doors for the door assembly.
Figure 8:
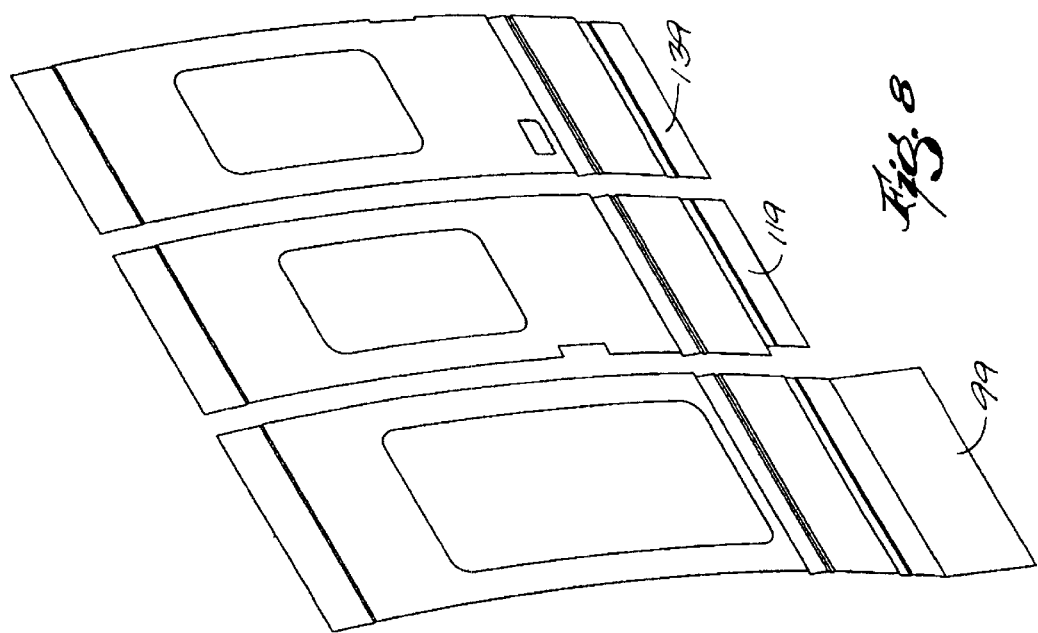
FIG. 8 is a perspective view of exterior plates for doors for the door assembly.

Each of the three doors 90, 110, 130 is of modern, 3-layer construction and includes an interior doorframe (97, 117, 137, respectively) as shown in FIG. 6. As can be seen in FIG. 7, internal support structure 98, 118, 138 is also provided for each of the three doors (90, 110, 130, respectively). Weather proofing, soundproofing and electrical wiring for the three doors (90, 110, 130) are conventional. Exterior plates 99, 119, 139 for each of the three doors are depicted in FIG. 8.

Securing straps or other mechanisms for securing a wheelchair at van floor 54 may be provided in vehicle 10. Such mechanisms may include a passenger safety belt, a wheelchair attachment strap, or a wheelchair restraint, which is fixed to van floor 54 and capable of withstanding forces reasonably expected to arise from acceleration or deceleration of vehicle 10.

Figure 9:
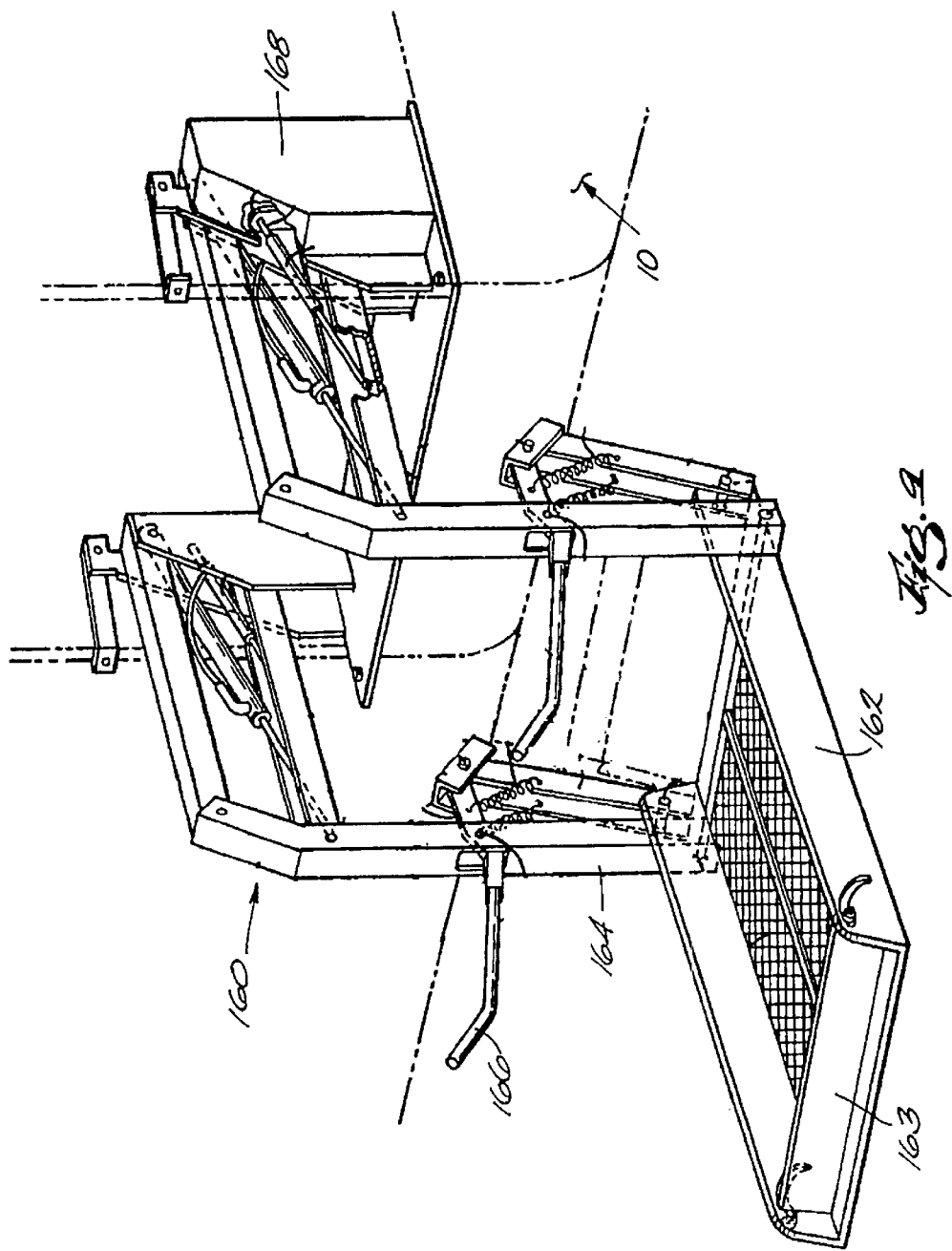
FIG. 9 is a perspective view of a wheelchair lift mounted on a vehicle of the present invention, with the vehicle shown in phantom line.

As shown in FIG. 9, assisted entrance 78 can be used with previously known devices such as wheelchair lift 160, to enable a physically-challenged passenger to enter vehicle 10. To this end, a wheelchair lift described in U.S. Pat. No. 6,238,169 is hereby incorporated by reference in its entirety, and specifically for its teachings regarding wheelchair lifts. Preferably, assisted seating positions (not shown) or open space is provided adjacent to assisted entrance 78.

Referring now to FIG. 9, lift 160 is mounted on vehicle 10 and is moveable between a lowered position, a raised position (not shown), and a storage position (not shown). Lift 160 includes platform 162, support member 164, folding hand rail 166 for minimizing the volume of lift 160 for storage, and lifting mechanism 168 for raising and retracting platform 162. In the lowered position, the wheelchair may be rolled out to platform 162 and secured by raising rotatable gate 163. When lift 160 is not being used, folding hand rail 166 rotates with platform 162 to a vertical position and lifting mechanism 168 raises and retracts. It should be understood that platform 160 is only one example of many different types of equipment that can be used with the invention to assist passengers in entering through assisted doors 110, 130.

While the present invention has been illustrated by a description of various embodiments and while these embodiments have been set forth in considerable detail, it is intended that the scope of the invention be defined by the appended claims. It will be appreciated by those skilled in the art that modifications to the foregoing preferred embodiments may be made in various aspects. It is deemed that the spirit and scope of the invention encompass such variations to the preferred embodiments as would be apparent to one of ordinary skill in the art and familiar with the teachings of the present application.

That which is claimed is:

1. A door assembly for a vehicle equipped with an appliance for assisting passengers to enter the vehicle, the door assembly comprising:

a frame assembly for mounting on a vehicle equipped with an appliance for assisting passengers to enter the vehicle, the frame assembly including:

an assisted entrance appropriately sized and elevated with respect to the vehicle for a passenger assisted by the appliance to enter the vehicle; and an unassisted entrance appropriately sized and elevated with respect to the vehicle for an unassisted passenger to enter the vehicle, the unassisted entrance being positioned immediately adjacent to the assisted entrance when the door assembly is mounted on the vehicle; and a stairwell attached to the frame assembly and positioned to serve the unassisted entrance.

2. The door assembly of claim 1, in which the frame assembly substantially surrounds the assisted entrance and the unassisted entrance, and includes a generally vertically-oriented post that divides the assisted entrance from the unassisted entrance.

3. The door assembly of claim 1, in which the unassisted entrance is positioned rearward of the assisted entrance when the door assembly is mounted on the vehicle.

4. The door assembly of claim 1, in which the assisted entrance is appropriately sized and elevated with respect to the vehicle for use with at least one of a ramp and a lift.

5. The door assembly of claim 1, which the assisted entrance is appropriately sized and elevated with respect to the vehicle for use with a lift, which includes:

a support member movably mounted on the vehicle for movement from a lowered position, in which the support member is lowered relative to the vehicle, to a raised position, in which the support member is raised relative to the vehicle; and a lift mechanism for moving the support member from the lowered position to the raised position.

6. The door assembly of claim 1, in which the vehicle includes a passenger compartment floor having a cut-out area, the stairwell is inserted into the floor cut-out.

7. The door assembly of claim 1, in which the vehicle includes a passenger compartment wall having a cut-out area, and the frame assembly stairwell is inserted into the wall cut-out.

8. The door assembly of claim 1, in which the unassisted entrance includes a door for closing the unassisted entrance and the stairwell.

9. The door assembly of claim 1, in which the assisted entrance includes two outward-opening doors for closing the assisted entrance.

10. The assembly of claim 1, in which the vehicle is an automobile having a passenger compartment floor.

11. The door assembly of claim 10, in which the stairwell includes a tread positioned below the floor.

* * * * *